United States Patent
Adam

(10) Patent No.: US 6,419,722 B1
(45) Date of Patent: *Jul. 16, 2002

(54) RECYCLED SOIL

(76) Inventor: Paul Thomas Adam, 1661 Beaver Valley Rd., Flinton, PA (US) 16640

(*) Notice: Subject to any disclaimer, the term of this patent is extended or adjusted under 35 U.S.C. 154(b) by 0 days.

This patent is subject to a terminal disclaimer.

(21) Appl. No.: 09/965,787

(22) Filed: Sep. 28, 2001

Related U.S. Application Data

(63) Continuation-in-part of application No. 09/372,841, filed on Aug. 21, 1999, now Pat. No. 6,302,936.

(51) Int. Cl.⁷ .............................. C05F 3/00; C05F 11/02
(52) U.S. Cl. ..................... 71/13; 71/15; 71/24; 71/25; 71/903; 71/94; 47/4; 405/258
(58) Field of Search ............................... 71/13, 15, 24, 71/25, 903, 904; 47/4; 405/258

(56) References Cited

U.S. PATENT DOCUMENTS 4,812,339 A * 3/1989 Shibata et al. ................ 428/15
5,282,873 A * 2/1994 Watari ........................ 47/1.01
5,312,661 A * 5/1994 Suzuki et al. ............... 428/36.5
5,472,475 A * 12/1995 Adam ............................ 71/13
6,302,936 B1 * 10/2001 Adam ............................ 71/13

* cited by examiner

*Primary Examiner*—Chihaya D. Sayala
(74) *Attorney, Agent, or Firm*—Eugene C. Rzucidlo; Greenberg Traurig LLP

(57) ABSTRACT

A process for making an artificial soil includes first combining the volume percentages of the following substances:

1–99% materials suitable for use as a blending base;
   1–99% cellulose;
   0.01–60% bio-solids;
   0.01–10% calcium in any form;
   0.01–10% charcoal or it's equivalents; and
   0.05–5% ammonium nitrate, ammonium sulfate, or calcium nitrate. The above substances are ground until a homogeneous mixture is obtained, after which the artificial soil can be either blended in place or manufactured at one location and transported to another location for use.

15 Claims, No Drawings

RECYCLED SOIL

CROSS REFERENCE TO RELATED U.S. APPLICATIONS

This application is a continuation-in-part application from Adam, "Recycled Soil", U.S. patent application Ser. No. 09/372,841, filed Aug. 12, 1999, now U.S. Pat. No. 6,302,936, incorporated herein by reference.

BACKGROUND OF THE INVENTION

1. Field of the Invention

The present invention is a method of preparing artificial or recycled soil. As is generally understood, topsoil erosion due to deforestation, over-farming, and poor soil management by farmers along with natural desertification are the root causes of many of our environmental problems. Topsoil comprises many distinct layers, the most important of which for the purposes of this invention are referred to in the art as the "A-layer", the "B-layer", and the "C-layer". The A-layer is the uppermost layer and includes humus and microbial biomass mixed with small-grained minerals. The B-layer is below the A-layer and is characterized by an accumulation of clay particles. The C-layer is below the B-layer and includes unconsolidated parent material from which the A- and B-layers are derived among other naturally occurring ingredients. The C-layer includes little or no humus accumulation or soil structure development.

It is therefore my intent to treat the cause rather than the effect by creating an artificial soil to replace the lost natural soil or recycle natural soil in place in fields, groves, and any site that may need soil or where the already existing soil may need to be recycled. The product can be prepared in place or shipped to other locations. It is useful and practical as potting soil, in green houses, nurseries, gardens, for retail outlets, landscapers, farmers, silviculture, large scale reclamation such as landfills, strip mines, urban wasteland, superfund sites, highways, flood control levees, deforested areas, golf courses, sports fields and even in artificial environments in space and on earth. Pesticides, including herbicides, insecticides, fungicides, and bactericides, can be included in the blend for specific site requirements.

2. Description of Prior Art

In the past there have been proposals for artificial soil, some of which currently hold patents in the United States. One of these patents, U.S. Pat. No. 4,501,604 ("'604 patent"), is, in my opinion, impractical for widespread use due to expensive, lengthy, and complicated manufacturing processes. Another patent, U.S. Pat. No. 5,472,475, is mine. My invention solves these problems by using inexpensive existing technology, recycled materials, and simple manufacturing techniques. In the case of the '604 patent, long periods of time and several locations are required, whereas with my process the ingredients can be mixed by hand or by using any of the equipment disclosed herein at one location in just a few minutes, producing, in effect instant soil.

SUMMARY OF THE INVENTION

The object of the invention is to produce an artificial soil from well known and easily obtainable substances. The loss of topsoil is a critical issue for the future of our national and global economies. By replacing lost topsoil we can continue to grow crops and forests indefinitely. We can replace and restore soil in every country and thereby feed the world's expanding population. The ability to recycle soils will allow developing countries to help feed areas where agriculture is difficult. Civilization and soil fertility go hand in hand, cities and populations are dependent on soil fertility and when it declines civilization declines with it.

The first step in making an artificial topsoil, if you want to add mineral content, is to create a blending base. Materials suitable for a blending base include, either alone or in combination, river silt, dredged material, sand, basalt, rhyolyte, clay, mine tailings, residuals, or any natural or manmade, treated or processed, waste products applicable for use in making soils, pre-existing soil, soil taken from another location, any ordinarily depleted, eroded, or contaminated soil, or B-layer soil. This blending base can be placed on top of or combined with any C-layer.

Next, add cellulose in any form, composted or uncomposted, with composted human waste for mine and landfill type reclamation and composted animal manure for forests or natural areas with wildlife and for farms of all kinds. For a cleaner formula for gardens or potting soil, use vegetable or fruit residuals (the fruit or vegetable itself or its rinds or skins or seeds), bagged or loose.

Then add calcium or lime in any form, such as agricultural lime, quick lime or calcium phosphate, ammonium nitrate or sulfate, preferably but not necessarily mixed with water, and then charcoal or equivalent amounts of phosphorus, potassium, and sulfur as are present in charcoal. The concentration of ammonium nitrate or sulfate can be adjusted to achieve a desired ph, and is optional if animal or human bio-solids are used. This combination of materials replicates the mineral base, cellulose and animal and vegetable waste structure of natural soils.

Note that any of the above ingredients can be contaminated, decontaminated or uncontaminated.

Any soil type on earth can be duplicated by adjusting the blending base, and re-arranging the nutrient and mineral content so as to compensate for differing levels of each in any soil. This formula can be blended into any natural, manmade, processed, treated, contaminated or uncontaminated pre-existing soil or manufactured blending base. Alternatively, the formula can be blended by itself using the following equipment: any kind of plow, a pugmill or any commercial soil blender, a soil stabilizer, a roto-tiller of any size or type, a manure spreader, vehicles designed to spread soil additives, trommel type screens, cement mixer of any size or type, barrels, tubs, buckets, shovels, rakes, a hoe, or by hand. After the soil is blended, the local microbiotic life can be transplanted by gathering small amounts of local natural surface soil and inoculating by spreading over the blended area.

DETAILED DESCRIPTION OF THE PREFERRED EMBODIMENTS

Because of the shallow root structures of most food crops, it is only necessary to replace the A-layer in order to revive a depleted field. This layer consists of approximately one foot of dead plant cellulose, animal waste, charcoal, and a mineral base from the following materials: silt, clay, sand, basalt, rhyolyte, limestone or granite. These materials when combined make up the structure of natural soil profiles.

To make an artificial soil, combine 1 to 99% percent by volume, silt, dredged material, sand, clay, basalt, rhyolyte or blend the aforementioned substances into already existing soils in place. Next, add 1 to 99% cellulose, composted or uncomposted, from recycled wood products such as short fiber waste, sawdust, paper, green waste, yard waste, crop leaves, stems, roots, fruit, vegetable, or any other form of cellulose with 0.10 to 60% fruit or vegetables residuals or bio-solids in the form of lime-treated, thermally-treated, or composted animal or human waste, or bio-solids in any other form. Then add 0.01 to 10% agricultural lime, calcium phosphate, or calcium in any other form, and 0.01 to 5% ammonium nitrate, ammonium sulfate or calcium nitrate, not necessarily but preferably mixed with water, and 0.01 to 5% charcoal or its equivalents. As an alternative to charcoal, nitrogen-phosphorus-potassium ("NPK") fertilizer, field burn-off, potash, calcium phosphate, or the equivalent amounts of phosphorus, potassium and sulfur as are present in charcoal can be added to the soil. Calcium and organic percentages should be increased to the maximum when using sand as a base. The calcium should be decreased to the minimum when using silt, dredged material, clay, basalt, or rhyolyte as a base. Also, any naturally present, manmade, treated, processed, contaminated or uncontaminated waste product can be used as a blending base or ingredient. The above ingredients can be contaminated, uncontaminated, or decontaminated.

The mixture can be manufactured by hand or with any of the equipment mentioned in this disclosure. Except for ammonium sulfate or nitrate or calcium nitrate, the dry ingredients are mixed first, after which the ammonium nitrate or sulfate or calcium nitrate is mixed with water and added until the mixture acquires a friable texture. Bio-solids can be optional where contaminants or cost is problematic.

The exact percentages by weight and volume I used to blend a prototype mixture are as follows (allow some variation due to different methods of mixing).

| Ingredients | Volume | Weight |
| --- | --- | --- |
| Silt | 30.17 | 71.36 |
| Cellulose | 58.63 | 14.70 |
| Residuals | 7.24 | 2.59 |
| Lime | 3.88 | 11.23 |
| A. nitrate | 0.074 | 0.1 |
| Charcoal | 0.01 | 0.1 |

In addition, the following substances can be blended into an already existing soil, dredged material, base material, B-layer, or laid on top of or mixed into any C-layer, wherein the materials can be natural, manmade, contaminated or uncontaminated, and treated or untreated or processed in any way. The concentrations presented herein below are based on a 6 inch layer, which corresponds to 807 cubic yards per acre. This can be increased to a 12 inch layer, or 1614 cubic yards per acre, where depth is required. For landfills, a 24 inch layer at minimum, or 3227 cubic yards per acre, is preferable. However, there are situations where even thicker layers are necessary, and the soil layers of the invention are not limited to the thicknesses recited herein. The proportions in the following table are for layers extending from 1 inch to 12 inches thick.

| Ingredients | Concentration |
| --- | --- |
| Cellulose | 8.07 to 799 cubic yards per acre |
| Bio-solids | 0.081 to 484 cubic yards per acre |
| Calcium | 0.081 to 80.7 cubic yards per acre |
| Charcoal or equivalent | 0.081 to 80.7 cubic yards per acre |
| A. nitrate or A. sulfate or Calcium nitrate | 0.04 to 32.3 cubic yards per acre |

Dredged materials, silt, sand, clay, basalt and/or rhyolyte can also be added to an already existing, mostly cellulose soil, such as peat or rainforest soil, to allow the soil to grow any desired crop, either indigenous or foreign. A preferred concentration for these added materials is in the range of 0.81 to 799 cubic yards per acre. These concentrations are based on 1 to 50% dredged material being added to 1 to 99% organic material. Alternatively, any mineral or combination of minerals suitable for growing a particular crop can be added to the pre-existing soil.

The system of the invention is not limited to the embodiments disclosed herein. It will be immediately apparent to those skilled in the art that variations and modifications to the disclosed embodiment are possible without departing from the spirit and scope of the present invention. The invention is defined by the appended claims.

What is claimed is:

1. An artificial soil composition which can duplicate any natural soil, said artificial soil comprising a homogeneous mixture of the following substances, in which the percentage range by volume of said substances is:
   1–5% substances suitable for use as a blending base, wherein these substances can be unprocessed, processed in any way, uncontaminated, or contaminated;
   1–5% cellulose, wherein the cellulose can be uncontaminated, contaminated, uncomposted, composted, or processed in any way;
   0.1–0.5% bio-solids, either unprocessed or processed in any way;
   0.01–0.1% calcium in any form;
   0.01–0.1% field burn-off, potash, charcoal, or calcium phosphate; and
   4–5% ammonium sulfate or calcium nitrate.

2. The soil composition of claim 1, wherein the calcium is selected from the group consisting of calcium silicate, calcium phosphate, quick lime and lime, or is replaced by aluminosilicate.

3. The soil composition of claim 1, wherein the ammonium sulfate is replaced from the group consisting of animal bio-solids, human bio-solids, and ammonium nitrate.

4. An artificial soil composition which can duplicate any natural soil, said artificial soil comprising a homogeneous mixture of the following substances, in which the percentage range by volume of said substances is:
   95–99% substances suitable for use as a blending base, wherein these substances can be unprocessed, processed in any way, uncontaminated, or contaminated;
   95–99% cellulose, wherein the cellulose can be uncontaminated, contaminated, uncomposted, composted, or processed in any way; and
   50–60% bio-solids, either unprocessed or processed in any way.

5. The soil composition of claims 1 or 4, wherein the bio-solids are selected from the group consisting of stems, crop leaves, roots, sawdust, seeds, animal waste, human waste, or fruit and vegetable residuals.

6. The soil composition of claims 1 or 4, wherein the cellulose is selected from the group consisting of saw dust, short fiber waste, green waste, crop waste, recycled paper, and yard leaves.

7. The soil composition of claims 1 or 4, wherein the material suitable for use as a blending base is selected from the group consisting of dredged material, clay, any naturally present or manmade waste product, pre-existing soil, B-layer soil, C-layer soil, silt, sand, basalt, rhyolyte, and mixtures thereof.

8. The soil composition of claims 1 or 4, wherein the charcoal can be replaced by a combination of phosphorus, potassium and sulfur in proportions as are present in charcoal.

9. A soil composition comprising any combination of soils selected from the group consisting of existing soil, dredged material, base material, B-layer soil, and C-layer soil, and one or more of the following substances, wherein the concentration range by volume of said following substances for a 1 inch to 12 inch thick layer of said soil composition is:

cellulose, at 8.07 to 40.4 cubic yards per acre;

bio-solids, at 0.081 to 4 cubic yards per acre;

calcium, at 0.081 to 0.81 cubic yards per acre;

charcoal, at 0.081 to 0.81 cubic yards per acre; and ammonium nitrate, ammonium sulfate or calcium nitrate, at 0.04 to 4.04 cubic yards per acre.

10. A soil composition comprising any combination of soils selected from the group consisting of existing soil, dredged material, base material, B-layer soil, and C-layer soil, and one or more of the following substances, wherein the concentration range by volume of said following substances for a 1 inch to 12 inch thick layer of said soil composition is:

cellulose, at 767 to 799 cubic yards per acre;

bio-solids, at 440 to 484 cubic yards per acre; and charcoal, at 40.4 to 80.7 cubic yards per acre, range by volume of said substances is from 404 to 799 cubic yards per acre.

11. A process for making an artificial soil comprising the steps of:

(a) combining the volume percentages of the following substances:

1–5% substances suitable for use as a blending base, wherein these substances can be unprocessed, processed in any way, uncontaminated, or contaminated;

1–5% cellulose, wherein the cellulose can be uncontaminated, contaminated, uncomposted, composted, or processed in any way;

0.1–0.5% bio-solids, wherein the bio-solids can be unprocessed or processed in any way;

0.01–0.1% calcium in any form;

0.01–0.1% field burn-off, or charcoal;

4–5% ammonium nitrate, ammonium sulfate or calcium nitrate;

(b) grinding the above substances until a homogeneous mixture is obtained, wherein said artificial soil can be either blended in place or manufactured at one location and transported to another location for use.

12. A process for making an artificial soil comprising the steps of:

(a) combining the volume percentages of the following substances:

95–99% substances suitable for use as a blending base, wherein these substances can be unprocessed, processed in any way, uncontaminated, or contaminated;

95–99% cellulose, wherein the cellulose can be uncontaminated, contaminated, uncomposted, composted, or processed in any way; and 50–60% bio-solids, wherein the bio-solids can be unprocessed or processed in any way.

(b) grinding the above substances until a homogeneous mixture is obtained, wherein said artificial soil can be either blended in place or manufactured at one location and transported to another location for use.

13. The process of claims 11 or 12, wherein the substances suitable for use as a blending base include dredged material, clay, any naturally present or manmade waste product, pre-existing soil, B-layer soil, C-layer soil, silt, sand, basalt, rhyolyte, and mixtures thereof.

14. The process of claims 11 or 12, wherein the cellulose includes saw dust, short fiber waste, green waste, crop waste, recycled paper, and yard waste.

15. The process of claims 11 or 12, wherein the bio-solids are selected from the group consisting of stems, leaves, roots, trunks, bark, seeds, any plant part, animal waste, human waste, or fruit and vegetable residuals.

* * * * *